(12) United States Patent
Baumann et al.

(10) Patent No.: US 8,910,122 B2
(45) Date of Patent: Dec. 9, 2014

(54) VALIDATING TRANSLATIONS OF EXTERNALIZED CONTENT FOR INCLUSION IN AN APPLICATION

(75) Inventors: Warren J. Baumann, Monroe, NY (US); Firas Bouz, Lexington, KY (US); Douglas S. Brown, Charlotte, NC (US); William M. Higginbotham, Johnson City, TN (US)

(73) Assignee: International Business Machines Corporation, Armonk, NY (US)

( * ) Notice: Subject to any disclaimer, the term of this patent is extended or adjusted under 35 U.S.C. 154(b) by 1041 days.

(21) Appl. No.: 12/816,587

(22) Filed: Jun. 16, 2010

(65) Prior Publication Data

US 2011/0314451 A1 Dec. 22, 2011

(51) Int. Cl.
G06F 9/44 (2006.01)

(52) U.S. Cl.
CPC .................................. *G06F 9/4448* (2013.01)
USPC ........................................................ 717/126

(58) Field of Classification Search
None
See application file for complete search history.

(56) References Cited

U.S. PATENT DOCUMENTS

| | | | |
|---|---|---|---|
| 5,799,276 A * | 8/1998 | Komissarchik et al. | 704/251 |
| 6,151,022 A * | 11/2000 | Alshibani et al. | 715/788 |
| 6,311,567 B1 * | 11/2001 | England | 73/806 |
| 7,437,704 B2 | 10/2008 | Dahne-Steuber et al. | |
| 7,440,888 B2 | 10/2008 | Chen et al. | |
| 7,516,442 B2 | 4/2009 | Wu et al. | |
| 7,543,189 B2 * | 6/2009 | Fichter et al. | 714/38.14 |
| 7,552,452 B2 | 6/2009 | McHugh et al. | |
| 7,617,092 B2 | 11/2009 | McHugh et al. | |
| 7,958,407 B2 * | 6/2011 | Underdal et al. | 714/57 |
| 8,160,865 B1 * | 4/2012 | Coughlan et al. | 704/4 |
| 8,489,980 B2 * | 7/2013 | Lakritz | 715/200 |
| 2006/0236254 A1 * | 10/2006 | Mateescu et al. | 715/762 |
| 2006/0287844 A1 | 12/2006 | Rich | |
| 2008/0141164 A1 * | 6/2008 | Jiang | 715/786 |
| 2008/0189096 A1 * | 8/2008 | Apte et al. | 704/2 |
| 2009/0037830 A1 * | 2/2009 | Kulkarni et al. | 715/764 |
| 2009/0119091 A1 | 5/2009 | Sarig | |
| 2010/0306747 A1 * | 12/2010 | Pawlowsky | 717/137 |

FOREIGN PATENT DOCUMENTS

EP   WO 2008028733   3/2008

OTHER PUBLICATIONS

Parallels "The Guide to Localizing Parallels Plesk Panel 11", published 1999, pp. 1-23 [online][retrieved on Apr. 25, 2013]. Retrieved from <<http://www.parallels.com/fileadmin/parallels/documents/hosting-cloud-enablement/WPB/plesk-localization-guide.pdf>>.*

* cited by examiner

*Primary Examiner* — Li B Zhen
*Assistant Examiner* — Evral Bodden
(74) *Attorney, Agent, or Firm* — Schmeiser, Olsen & Watts; Matthew H. Chung

(57) ABSTRACT

A method and system for validating translated files for inclusion in an application being developed. Translatable files having externalized content in a single base language are sent for translation into other languages. Translated files resulting from a translation of the translatable files are received. Each translated file is statically and dynamically validated to detect error(s). The static validation is based on comparing the translatable files to the translated files. The dynamic validation is based on a simulation of how a user interface of the application presents the externalized content, without including an actual presentation of the externalized content by the user interface. Modified translated files that correct the detected error(s) are received and provided for a presentation of the externalized content by the user interface.

12 Claims, 9 Drawing Sheets

300 ↓

1. plugin_de.properties (German)
2. application_de.properties (German)
3. plugin_en.properties (English)
4. application_en.properties (English)
5. plugin_en_US.properties (English-United States)
6. application_en_US.properties (English-United States)
7. plugin_en_UK.properties (English-United Kingdom)
8. application_en_UK.properties (English-United Kingdom)
9. plugin_es.properties (Spanish)
10. application_es.properties (Spanish)
11. plugin_fr.properties (French)
12. application_fr.properties (French)
13. plugin_fr_CA.properties (French-Canada)
14. application_fr_CA.properties (French-Canada)
15. plugin_it.properties (Italian)
16. application_it.properties (Italian)
17. plugin_ja.properties (Japanese)
18. application_ja.properties (Japanese)
19. plugin_ko.properties (Korean)
20. application_ko.properties (Korean)
21. plugin_pt_BR.properties (Portuguese-Brazil)
22. application_pt_BR.properties (Portuguese-Brazil)
23. plugin_zh.properties (Chinese-Simplified)
24. application_zh.properties (Chinese-Simplified)
25. plugin_zh_HK.properties (Chinese-Hong Kong)
26. application_zh_HK.properties (Chinese-Hong Kong)
27. plugin_zh_TW.properties (Chinese-Taiwan)
28. application_zh_TW.properties (Chinese-Taiwan)

```
acmeweb/
eclipse/
plugins/
com.example.acme.acmewebsupport_1.0.0/
plugin.xml
about.properties (default locale)
com.example.acme.fragmentofacmewebsupport_1.0.0/
fragment.xml (a fragment of
com.example.acme.acmewebsupport 1.0.0)
nl/
fr/
about.properties (French locale)
CA/
toc_topic1.xml
toc_topic2.xml
toc_topic3.xml
html/
help_topic1.html
help_topic2.html
help_topic3.html
about.properties (French Canadian locale)
FR/
EURO/
toc_topic1.xml
toc_topic2.xml
toc_topic3.xml
html/
help_topic1.html
help_topic2.html
help_topic3.html
about.properties (French France Euros)
toc_topic1.xml
toc_topic2.xml
toc_topic3.xml
html/
help_topic1.html
help_topic2.html
help_topic3.html
```

*FIG. 4A*

```
400-2
en/
about.properties  (English locale)
  CA/
  toc_topic1.xml
  toc_topic2.xml
  toc_topic3.xml
  html/
  help_topic1.html
  help_topic2.html
  help_topic3.html
  about.properties  (English Canadian locale)
  US/
  toc_topic1.xml
  toc_topic2.xml
  toc_topic3.xml
  html/
  help_topic1.html
  help_topic2.html
  help_topic3.html
  about.properties  (English US locale)
  toc_topic1.xml
  toc_topic2.xml
  toc_topic3.xml
  html/
  help_topic1.html
  help_topic2.html
  help_topic3.html de/
about.properties  (German locale)
  html/
  help_topic1.html
  help_topic2.html
  help_topic3.html
  toc_topic1.xml
  toc_topic2.xml
  toc_topic3.xml
```

FIG. 4B

VALIDATING TRANSLATIONS OF EXTERNALIZED CONTENT FOR INCLUSION IN AN APPLICATION

FIELD OF THE INVENTION

The present invention relates to data processing techniques for facilitating software application development, and more particularly to a technique for statically and dynamically validating translated files to be included in an application being developed.

BACKGROUND OF THE INVENTION

In the development of internationalized software applications, translation of the user interface content is a tedious, error-prone, and lengthy process. Known complex software applications use a number of modules or plug-ins (e.g., over 50 modules or plug-ins) to define the function and behavior specific to an application. Each module or plug-in has at least one language-dependent, translatable file. A help plug-in for an application may contain one translatable file for each help topic, which can easily exceed 100 topics (i.e., 100 translatable files) for a large application. Preparing a large number of translatable files (i.e., exported files) for export and translation into multiple languages and the handling of returned translated files (i.e., imported files) is aggravated because one exported file results in multiple imported files (i.e., one imported file for each of the multiple languages). Typically, the exported file to imported file ratio is 1:9 or 1:14. Further, the process of importing the translated files is made difficult by specific file placement requirements dictated by the framework of the application being developed. Still further, known automated translation systems that receive and translate the translatable files may introduce hard-to-find formatting and/or syntax errors into the files themselves, where the errors may cause the application to fail and may not be apparent until runtime. Thus, there exists a need to overcome at least one of the preceding deficiencies and limitations of the related art.

SUMMARY OF THE INVENTION

Embodiments of the present invention provide a method of validating translated files for inclusion in an application being developed. The method comprises:

a computer system sending a single translation package having a plurality of translatable files in a single base language to a plurality of other computer systems for translation into a plurality of languages other than the base language, wherein the translatable files include externalized content that is external to code of the application being developed;

the computer system receiving a plurality of translated files in the plurality of languages, wherein the plurality of translated files is a result of translations of the translation package by the plurality of other computer systems, and wherein the translations provide one or more errors in the plurality of translated files;

a processor of the computer system determining the one or more errors in the plurality of translated files by statically validating each translated file of the plurality of translated files based on a comparison of the plurality of translatable files to the plurality of translated files and by dynamically validating each translated file of the plurality of translated files based on a simulation of how a user interface of the application presents the externalized content, wherein the simulation indicates syntax errors in the plurality of translated files without including a presentation of the externalized content by the user interface;

subsequent to statically and dynamically validating, the computer system receiving a modification of the plurality of translated files, wherein the modification eliminates the one or more errors; and the computer system providing the modification of the plurality of translated files for presentation of the externalized content by the user interface of the application.

A system, program product and process for supporting computing infrastructure corresponding to the above-summarized method are also described and claimed herein.

Embodiments of the present invention manage the process of extracting externalized content for a base application to be sent to multiple translation centers for translation and re-importing the translated results into the base application while ensuring the integrity of the results. Techniques disclosed herein reduce costs and labor time involved in detecting errors in translated files. The combination of static and dynamic validation disclosed herein allows teams (e.g., development or translation teams) to intercept syntax (i.e., mechanical translation) errors in translated files early in the application development process and without a need for integrating the translations into the application and manually traversing over all user interface screens to ensure proper display.

BRIEF DESCRIPTION OF THE DRAWINGS

FIG. 3 is an example of a list of translated files renamed in the process of FIGS. 2A-2B, in accordance with embodiments of the present invention.

FIGS. 4A-4B depict an example of a file structure generated in the process of FIGS. 2A-2B, where the file structure has a language folder that includes help system specific files, in accordance with embodiments of the present invention.

DETAILED DESCRIPTION OF THE INVENTION

Overview

Embodiments of the present invention provide a language translation technique for the content of a user interface of a software application. The language translation technique may include an automated export of translatable files that include the content of the user interface and an automated aggregation of the exported translatable files into a translation package. The translation package may be prepared for translation at multiple translation centers. The translatable files in the translation package are translated into multiple sets of translated files, each set including the content of the user interface translated into a corresponding language of multiple languages. The resulting translated files may be prepared for storage in corresponding places in a file structure. Each stored translated file may be tested to detect whether the translated file includes any mechanical translation errors that damage the integrity of the translated file.

As used herein, a language described in relation to content or a file being translated, or content or a file resulting from a translation is a natural language. A natural language is a language for human-to-human communication that arises in an unpremeditated fashion as a result of an innate facility for language possessed by the human intellect. A natural language may be, for example, a national language, national language variant, standard language or standard dialect. A natural language is distinguished from constructed languages and formal languages, such as computer programming languages and languages used in the study of formal logic. In one embodiment, a language being translated or resulting from a translation may be identified by a name of a language (e.g., a name of a national language). If the language being translated or resulting from a translation is a language variety (e.g., dialect), then the language may be identified by a name of a language and further identified either by a name of a country or by a name of a country and a name of a region of the country.

In one embodiment, the aforementioned content of the user interface of the software application is included in externalized content. As used herein, externalized content is defined as content that is external to source code of a software application and that is queried at runtime using a lookup method. Externalized content may be stored in, for example, property files, configuration (e.g., INI) files, Extensible Markup Language (XML) documents, databases, etc. As used herein, a property file is defined as a computer file that includes a list of key-value pairs. The content of the user interface of the software application is also referred to herein as user interface content.

System for Validating Translated Files

Figure 1:
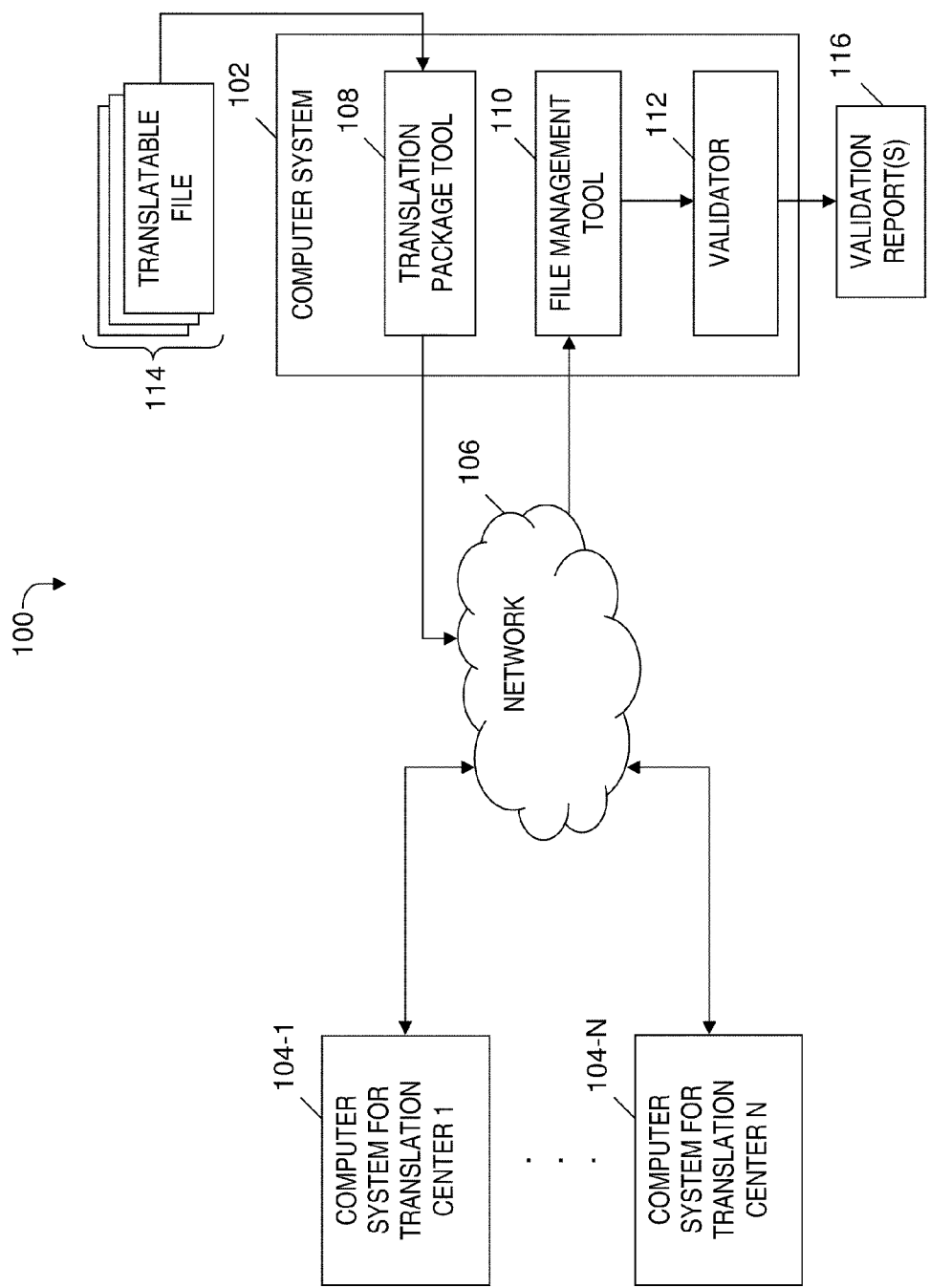
FIG. 1 is a block diagram of a system for validating translated externalized content files for inclusion in an application, in accordance with embodiments of the present invention.

FIG. 1 is a block diagram of a system for validating translated externalized content files (a.k.a. translatable files) for inclusion in an application, in accordance with embodiments of the present invention. A system 100 includes a computer system 102 and multiple computer systems 104-1, . . . , 104-N for multiple translation centers 1, . . . , N. Computer systems 104-1, . . . , 104-N are in communication with and exchange files with computer system 102 via a network 106. Computer system 102 runs program code that may include a translation package tool 108, a file management tool 110 and a validator 112. Translation package tool 108 receives multiple translatable files 114. Each translatable file 114 includes externalized content to be presented by a user interface of a software application being developed. Translation package tool 108 aggregates translatable files 114 into a translation package. The translatable files 114 in the translation package include externalized content that is expressed in a single language (i.e., the base language).

Via network 106, translation package tool 108 sends the same translation package to computer systems 104-1, . . . , 104-N managed by translation centers 1, . . . , N, respectively. Each of the translation centers 1, . . . , N translates the externalized content included in the translation package into a language corresponding to the translation center. Via network 106, file management tool 110 receives translated files from computer systems 104-1, . . . , 104-N. Each translated file includes a translation of the externalized content that was generated by a corresponding translation center. File management tool 110 renames the translated files to prepare the files for storage in a file structure. After being stored in the file structure, validator 112 initiates a validation process that detects and corrects any mechanical translation errors in the translated files. Validator 112 generates a validation report 116 that lists the errors detected in the translated files. Additional descriptions of the functionality of components of system 100 are presented below in the discussions of FIGS. 2A-2B, FIG. 5 and FIG. 6.

Process for Validating Translated Filed

Figure 2A:
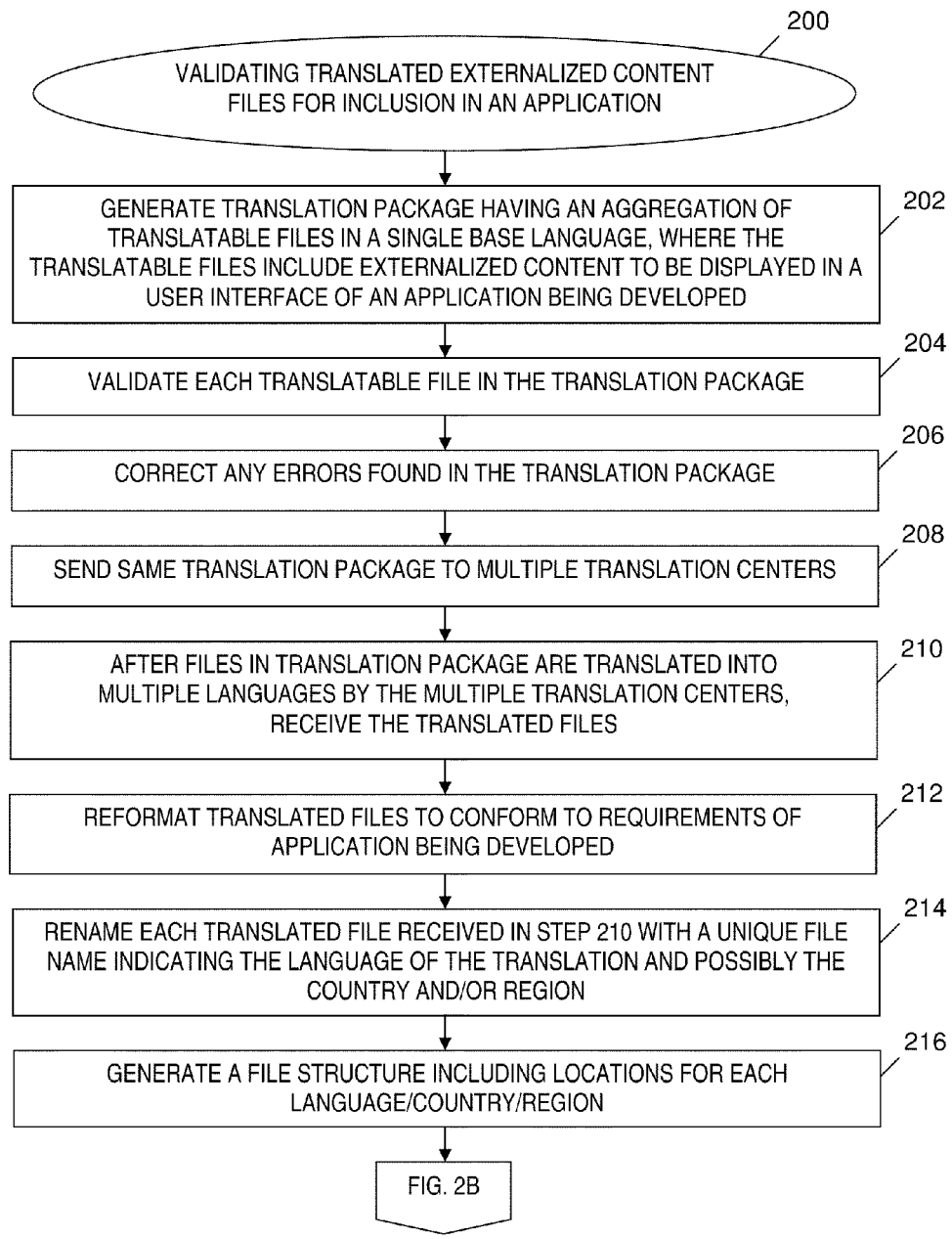
FIGS. 2A-2B depict a flowchart of a process for validating translated externalized content files for inclusion in an application, in accordance with embodiments of the present invention.
Figure 2B:
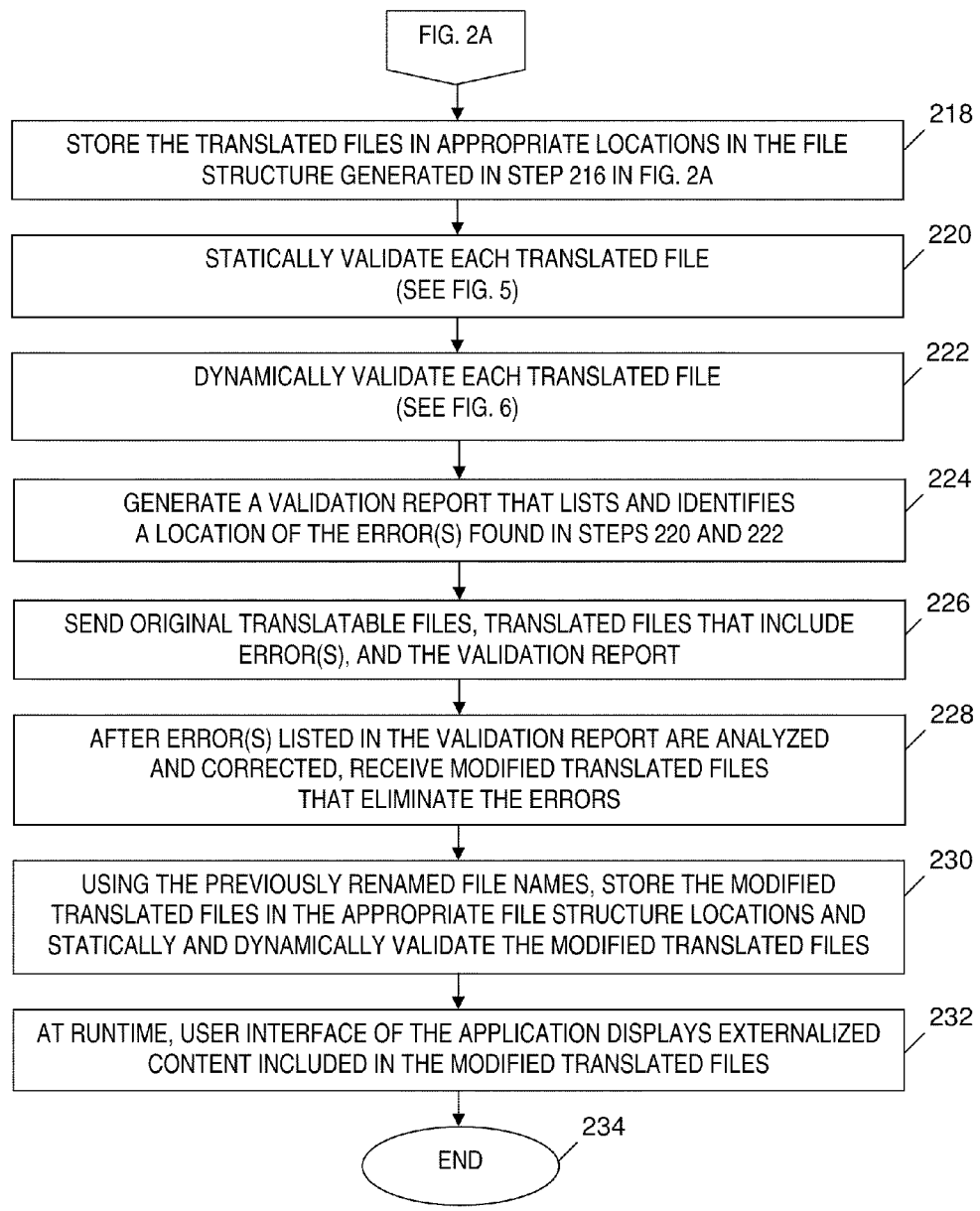

FIGS. 2A-2B depict a flowchart of a process for validating translated externalized content files for inclusion in an application in accordance with embodiments of the present invention. The process for validating translated externalized content files for inclusion in a software application starts at step 200 in FIG. 2A, which is prior to the build and deployment of the software application. In step 202, translation package tool 108 (see FIG. 1) generates a translation package by aggregating multiple translatable files 114 (see FIG. 1) that include user interface content expressed in a single base language.

In one embodiment, the user interface content is included in externalized content to be displayed and/or otherwise presented by the user interface of the software application being developed. Hereinafter, the software application being developed is referred to as "the application."

In one embodiment, prior to generating the translation package, step 202 includes exporting each translatable file 114 (see FIG. 1) from the individual development environment (IDE). In another embodiment, prior to generating the translation package, step 202 includes exporting each translatable file 114 (see FIG. 1) from the Source Code Repository (SCR).

In step 204, translation package tool 108 (see FIG. 1) validates each translatable file 114 (see FIG. 1) in the translation package by determining whether each translatable file conforms to syntax rules of the translation centers (e.g., syntax rules of translation systems running on computer systems 104-1, . . . , 104-N in FIG. 1). For example, step 204 includes using CHKPII or a similar validation tool to detect one or more errors related to the syntax rules of the translation centers.

In step 206, translation package tool 108 (see FIG. 1) corrects one or more errors detected in the validation step performed in step 204. In step 208, translation package tool 108 (see FIG. 1) sends the same translation package to computer systems 104-1, . . . , 104-N (see FIG. 1), which are utilized by multiple translation centers. In one embodiment, step 208 includes an application development team using computer system 102 (see FIG. 1) sending the translation package to translation teams utilizing computer systems 104-1, . . . , 104-N, where each translation team is responsible for translating the user interface content in the translation package into one or more languages and/or one or more variations of a language.

After step 208 and prior to step 210, the multiple translation centers receive the translation package sent in step 208 and translate the translatable files in the translation package into sets of translated files. Each set of translated files is in a corresponding language of a plurality of languages. The plurality of languages may include variations of a language based on a country and/or a region of a country. For example, the plurality of languages may include a first variation of English associated with the United Kingdom and a second variation of English associated with the United States.

Each translated file resulting from a translation of a translatable file by a translation center includes the externalized content translated into a corresponding language.

In one embodiment, computer systems 104-1, ..., 104-N (see FIG. 1) automatically translate the translatable files 114 (see FIG. 1) in the translation package and store the resulting translations in the sets of translated files.

In step 210, file management tool 110 (see FIG. 1) receives the sets of translated files that each result from a translation center translating the translatable files in the translation package into a corresponding language.

In step 212, file management tool 110 (see FIG. 1) reformats each translated file received in step 210 to a form required by the architecture of the application. In step 214, file management tool 110 (see FIG. 1) renames each translated file received in step 210 with a unique file name indicating the language of the translation. The translation centers have the option of translating the translatable files to a level more detailed than the level of only a language. As one example, a translation center may translate a translatable file to the level of a language and a country (i.e., translate according to rules of a country-based variation of a language). As another example, a translation center may translate a translatable file to the level of a language, country and a region of the country (i.e., translate according to rules of a variation of a language, where the variation is based on a country and a region of that country).

In step 216, file management tool 110 (see FIG. 1) generates a file structure that includes locations for storing translated files according to a language, and according to a country and region associated with a variety of the language. In one embodiment the generated file structure includes natural language (NL) folders for each language of the plurality of languages to which the translation centers translate the translatable files. The generated file structure optionally includes a NL folder for a country if the translation by the translation center associated with the country is a translation to a variety of a language, where the variety is based on the country. Further, the generated file structure optionally includes a NL folder for a region of a country if the translation by the translation center associated with the region is a translation to a variety of a language, where the variety is based on the country and the region of the country.

After step 216, the process of validating translated files continues with step 218 in FIG. 2B. In step 218, file management tool 110 (see FIG. 1) stores the translated files in portions of the file structure that correspond to the translated files. In one embodiment, step 218 stores the translated files received in step 210 (see FIG. 2A) in NL folders whose names indicate the language of the translated file and optionally indicate either the country or the country and the region associated with the translated file.

After step 218 and prior to step 220, validator 112 (see FIG. 1) receives the translated files from file management tool 110 (see FIG. 1). In step 220, validator 112 (see FIG. 1) determines whether or not a first set of one or more errors exists in the translated files by statically validating each translated file based on a comparison of the translatable files to the translated files that correspond thereto. The aforementioned first set of one or more errors are translation errors that damage the integrity of the translated file. Additional description of the process of statically validating the translated files in step 220 is presented below relative to the discussion of FIG. 5.

In step 222, validator 112 (see FIG. 1) determines whether or not a second set of one or more errors exists in the translated files by dynamically validating each translated file based on a simulation of how the user interface of the application presents the externalized content. The simulation on which the dynamic validation is based indicates syntax errors (i.e., mechanical translation errors) in the translated files without including or requiring a display or other presentation of the externalized content by the user interface. The aforementioned second set of one or more errors are mechanical translation errors that damage the integrity of the translated file. Additional description of the dynamic validation process in step 222 is presented below relative to the discussion of FIG. 6.

In one embodiment, step 220 and/or step 222 determines that at least one error exists in the translated files (i.e., step 220 determines the first set of one or more errors exists in the translated files and/or step 222 determines the second set of one or more errors exists in the translated files).

The validation provided by steps 220 and 222 may be performed on the translated files as a group rather than requiring a review of a resultant user interface for each language in the translations to determine if the appropriate translated content is displaying properly.

In step 224, validator 112 (see FIG. 1) generates one or more validation reports 116 (see FIG. 1). Each validation report 116 (see FIG. 1) lists or otherwise identifies the error(s) determined for a set of translated files by the static and dynamic validations that are performed in step 220 and step 222, respectively. In one embodiment, the validation report 116 (see FIG. 1) identifies location(s) in the set of translated files at which error(s) determined in steps 220 and 222 occur. In one embodiment, the validation report 116 (see FIG. 1) for a set of translated files identifies one or more error messages that the user interface of the application would display or otherwise present if the application were to run using the set of translated files without correcting the error(s) determined for the set of translated files in steps 220 and 222.

In step 226, if one or more errors are detected in a set of translated files in step 220 and/or step 222, computer system 102 (see FIG. 1) sends information to the computer system (i.e., computer system 104-1, ... or 104-N in FIG. 1) managed by the translation center that translated the set of translated files. The information sent in step 226 includes the set of translated files that include the detected error(s), the validation report 116 (see FIG. 1) for the set of translated files, and the original translatable files that were included in the translation package generated in step 202 (see FIG. 2A). Step 226 sends the aforementioned information to the particular translation center that was responsible for generating the set of translated files.

If error(s) are detected in step 220 and/or step 222 in one or more other set(s) of translated files, then step 226 is repeated to send the set(s) of translated files, the validation report(s), and the original translatable files to the computer system(s) managed by the translation center(s) that translated the other set(s) of translated files.

After step 226 and prior to step 228, translation team(s) at the translation center(s) that receive the validation report(s) sent in step 226 analyze and correct the error(s) detected in step 220 and/or step 222, thereby generating modification(s) of the set(s) of translated files that eliminate the detected error(s). In step 228, after the error(s) are analyzed and corrected at the translation center(s), file management tool 110 (see FIG. 1) receives the modification(s) of the set(s) of translated files (a.k.a. set(s) of modified translated files) that eliminate the error(s) detected in step 220 and/or step 222.

In step 230, steps 218, 220 and 222 are repeated for the set(s) of modified translated files. Using the renamed file names (see step 214 in FIG. 2A), file management tool 110 (see FIG. 1) stores the set(s) of modified translated files in corresponding portions of the file structure generated in step 216 (see FIG. 2A). For example, the file management tool stores a set of modified translated files in a NL folder whose name indicates the language of the user interface content included in the set of modified translated files. After being stored in the file structure, step 230 also includes the content being statically and dynamically validated to determine whether any errors exist in the modified translated files. If no other error is detected by the static and dynamic validation, then step 230 is completed. If any errors are detected by the static and dynamic validation, then process loops back (not shown) to step 224 and repeats until no other error is detected by the static and dynamic validation.

In step 232, at runtime of the application, the user interface of the application displays the externalized content included in the set(s) of modified translated files without causing error conditions such as causing the application to fail. The process of FIGS. 2A-2B ends at step 234.

FIG. 3 is an example of a list of translated files renamed in the process of FIGS. 2A-2B, in accordance with embodiments of the present invention. An example 300 includes sample names of translated files that result from the renaming performed in step 214 of FIG. 2A.

As one example, plugin_de.properties and application_de.properties in lines 1 and 2 of example 300 are names of translated files that are the result of renaming translated files that originally had the base names of plugin.properties and application.properties, respectively, when the translated files were received in step 210 (see FIG. 2A) from a translation center that is responsible for translating user interface content into German. In this case, the renaming performed in step 214 (see FIG. 2A) added a language indicator "de" to the base names (i.e., by adding "_de" to indicate that the user interface content in the translated files had been translated into the German language by the translation center that is responsible for translating user interface content into German.

As another example, plugin_pt_BR.properties and application_pt_BR.properties in lines 21 and 22 of example 300 are names of translated files that are the result of renaming translated files that originally had the base names of plugin.properties and application.properties, respectively, when the translated files were received in step 210 (see FIG. 2A) from a translation center that is responsible for translating user interface content into the variety of the Portuguese language that is a standard language in the country of Brazil. In this case, the renaming performed in step 214 (see FIG. 2A) added "_pt_BR" to the base names to indicate that the translated files had been translated into a variety of Portuguese (i.e., indicated by the language indicator "pt") and the variety of Portuguese is standard in Brazil (i.e., indicated by the country indicator "BR").

Continuing the example described above relative to the renamed translated files in FIG. 3, step 216 (see FIG. 2A) creates a file structure having a NL1 Fragment folder that includes language varieties of translations of the plugin.properties file. After translating the application.properties file to German and renaming the translated file to application_de.properties (see FIG. 3), the application_de.properties is stored in a NL1 Fragment source folder (see step 218 in FIG. 2B). The folder nl/de (i.e., German) folder is created as part of the file structure generated in step 216 (see FIG. 2A) with the language indicator (i.e., "de") that had also been used as a language indicator in the renaming process of step 214 (see FIG. 2A).

As another example, if the translated file had been renamed in step 214 (see FIG. 2A) with a name that includes language, country and region indicators, then the name of the folder created in step 216 (see FIG. 2A) also includes the language, country and region indicators.

The language-specific folders created in the file structure generated in step 216 (see FIG. 2A) segregate versions of non-properties files (see, e.g., plugin.xml in FIG. 4A) as translations are added to the file structure over time.

FIGS. 4A-4B depict an example 400-1, 400-2 of a file structure generated in the process of FIGS. 2A-2B, where the file structure has language folders that include help system specific files, in accordance with embodiments of the present invention. As shown in example 400-1 (see FIG. 4A) and 400-2 (see FIG. 4B), help system specific files (e.g., toc_topic1.xml and help_topic1.html) for multiple locales are incorporated into separate folders corresponding to the locales in the help plug-in depicted in FIGS. 4A-4B. The separate folders are part of the file structure generated in step 216 (see FIG. 2A). For instance, toc_topic1.xml for the French Canadian locale is stored in a folder named nl/fr/CA, where "fr" in the folder name indicates the language French and CA indicates Canada.

Figure 5:
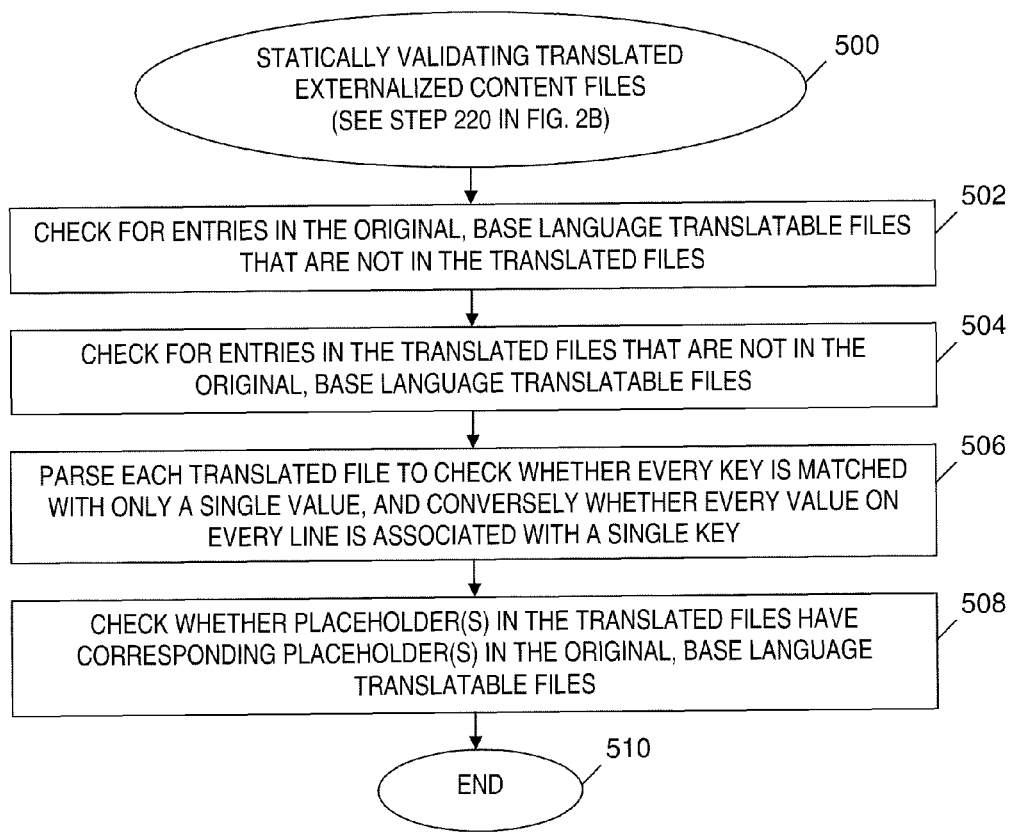
FIG. 5 is a flowchart of a static validation process included in the process of FIGS. 2A-2B, in accordance with embodiments of the present invention.

FIG. 5 is a flowchart of a static validation process included in the process of FIGS. 2A-2B, in accordance with embodiments of the present invention. The process of FIG. 5 is included in step 220 (see FIG. 2B) and starts at step 500. In step 502, validator 112 (see FIG. 1) checks for any entries in the original, base language translatable files (i.e., translatable files 114 in FIG. 1) that are not in a set of translated files received in step 210 (see FIG. 2A). If the check in step 502 finds one or more entries in the translatable files 114 (see FIG. 1) that are not in the set of translated files, then the validator detects one or more errors in the one or more entries. If the check in step 502 finds that all entries in the translatable files are in the set of translated files, then no errors are detected based on step 502.

A typical translation error detected by step 502 is an exclusion of an entry in the set of translated files, where the entry is included in the original translatable files 114 (see FIG. 1). In an example with a property file, such an error is in the form of an omission of a key whose value contains specific text.

In step 504, validator 112 (see FIG. 1) checks for any entries in the set of translated files that are not in the original, base language translatable files. If the check in step 504 finds one or more entries in the set of translated files that are not in the translatable files 114 (see FIG. 1), then the validator detects one or more errors in the one or more entries in the translated files. If the check in step 504 finds that all entries in the translated files are in the translatable files 114 (see FIG. 1), then no errors are detected based on step 504.

In one embodiment, step 504 also includes the validator 112 (see FIG. 1) checking whether a first count of the number of keys in the translatable files 114 (see FIG. 1) matches a second count of the number of keys in the set of translated files. An error is detected if the first count does not match the second count.

Many file-based content externalization methods (e.g., property files, INI files, etc.) allow long values to wrap around on wrapped lines so that a first line of a value wraps around to one or more subsequent lines of the value by "escaping" the end-of-line character (e.g., by inserting a "\" character at the end of a line to indicate to the runtime environment that the line does not end at the "\" character but rather continues to the next line). One type of error detected in step 504 is a translation error that mistakenly breaks wrapped lines instead of detecting the wrapped lines by detecting the escape of the end-of-line character. The translation error that breaks wrapped lines may be caused by a translator that interrupts the flow of wrapped lines by either removing end-of-line escape characters or by inserting one or more empty lines between wrapped components. As one example, consider the following property key-value in which the value of propertyKey1 is on a line that wraps to the second and third lines, as indicated by the "\" character at the end of the first and second lines:

propertyKey1=This is a line that will wrap to enhance reading \
but the translation may not detect the line wrap and will translate \
the second and third lines of this example as unique entries.
propertyKey2=This is the second entry.

As the translation in the example above mistakenly considers the wrapped lines (i.e., the second and third lines) as entries separate from the entry on the first line, the resulting set of translated files includes entries that are not included in the original translatable files 114 (see FIG. 1). For this example, step 504 detects errors related to the separate entries mistakenly detected on the second and third lines, which have no corresponding entries in the translatable files 114 (see FIG. 1).

In step 506, validator 112 (see FIG. 1) parses each translated file in a set of translated files to check whether every key is matched with only a single value, and conversely whether every value on every line of the translated files is associated with exactly a single key. If the check in step 506 finds one or more keys that are not each matched with exactly a single value and/or finds one or more values on one or more lines of the translated files that are each not associated with exactly a single key, then the validator detects one or more errors based on the one or more keys and/or the one or more values. If the check in step 506 finds that each key in the set of translated files is matched with exactly a single value and finds that each value in the set of translated files is associated with exactly one key, then no errors are detected based on step 506.

Certain usage of property files supports variable substitution, where the value of a property includes a placeholder for another value that is filled in during runtime. For example:

Value=this is a sample {0} variable substitution {1} property

The run time environment replaces the {0} and {1} placeholders in the example presented above with actual values as supplied by the code. In step 508, validator 112 (see FIG. 1) checks whether placeholder(s) in the set of translated files have corresponding placeholder(s) in the original, base language translatable files 114 (see FIG. 1). In one embodiment, the check in step 508 does not require the order of placeholders in the set of translated files to match the order of placeholders in the translatable files 114 (see FIG. 1).

If the check in step 508 finds one or more placeholders in the translated files that do not have corresponding placeholders in the translatable files, then the validator 112 (see FIG. 1) detects one or more errors in the one or more entries of the translated files that include the one or more placeholders. If the check in step 508 finds that all placeholders in the translated files have corresponding entries in the translatable files, then no errors are detected based on step 508. The process of FIG. 5 ends at step 510.

In one embodiment, at least one error in the set of translated files is detected based on the checks in steps 502, 504, 506 and 508.

Figure 6:
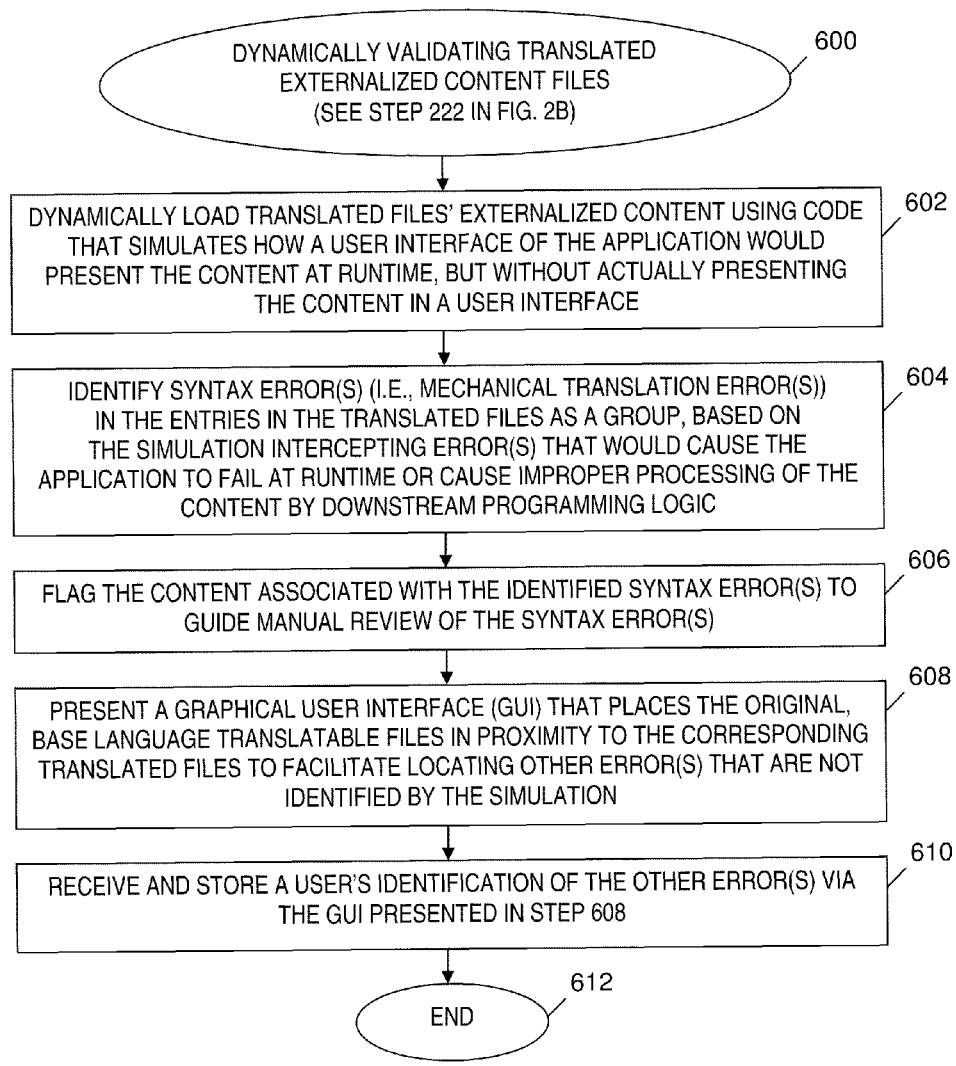
FIG. 6 is a flowchart of a dynamic validation process included in the process of FIGS. 2A-2B, in accordance with embodiments of the present invention.

FIG. 6 is a flowchart of a dynamic validation process included in the process of FIGS. 2A-2B, in accordance with embodiments of the present invention. The process of FIG. 6 is included in step 222 (see FIG. 2B) and starts at step 600. In step 602, validator 112 (see FIG. 1) dynamically loads externalized content included in the translated files using code that simulates how the externalized content is loaded into and presented by the user interface of the application at runtime, but without actually displaying or otherwise presenting the externalized content in the user interface. Since step 602 runs in a simulated environment, errors of any level of severity may be intercepted while loading a particular set of content (see step 604), and the content in question may be flagged for manual observation (see step 606).

In step 604, validator 112 (see FIG. 1) checks whether the simulation in step 602 intercepts error(s) that would cause the application to fail at runtime or cause improper processing of the externalized content (i.e., cause an error condition) by downstream programming logic. If error(s) are intercepted by the simulation, then the validator 112 (see FIG. 1) detects one or more syntax errors (i.e., one or more mechanical translation errors) in the entries in the set of translated files. If no errors are intercepted by the simulation, then the validator 112 (see FIG. 1) determines the validity of the mechanical structure (i.e., syntax) of the value of every key in the set of translated files. In one embodiment, step 604 determines that at least one error is intercepted by the simulation.

In step 606, validator 112 (see FIG. 1) flags the externalized content associated with syntax error(s) identified in step 604 for guiding a manual review and analysis of the syntax error(s).

In an optional step 608, validator 112 (see FIG. 1) presents a GUI that places the original base language translatable files on a display in proximity to corresponding translated files in the set of translated files. The proximate display of the translatable files and corresponding translated files facilitates a manual review that identifies and locates other error(s) that are not identified by the aforementioned simulation. In an optional step 610, computer system 102 (see FIG. 1) receives and stores a user's identification of the aforementioned other error(s) via the GUI presented in optional step 608. The process of FIG. 6 ends at step 612.

In one embodiment, at least one error in the set of translated files is detected based on the checks in steps 502, 504, 506 and 508 in FIG. 5 and based on the simulation in step 602 in FIG. 6.

Errors can result from improper modifications to formatting tokens in the externalized content. Most programming environments with rich User Interface allow the formatting of its content on the code as well as the externalized content level. Traditional methods for verifying the mechanical structure of an entity involve comparing the mechanical structure against the definition of the rules allowed in that context (i.e., similar to how a compiler verifies the syntax of a program in a particular programming language). However, the dynamic validation analysis in the process of FIG. 6 loads the content in a fashion similar to how the application does. The simulation allows independence of the syntax rules of the properties in question and provides the validator 112 (see FIG. 1) with the ability to intercept errors regardless of whether they are rich text formatting violations or application/language specific violations. The dynamic validation in the process of FIG. 6 breaks this dependency and ensures the interception of all unintended format changes.

Certain properties (i.e., keys) can be written with "directives" that instruct the validation process on how content should be loaded. For example, a long string of content may be broken into multiple properties intended to be reconstructed as one stream of content at runtime. This instruction of how content should be loaded also includes "variable substitution" which inserts, at runtime, values constructed by the code. For example, the syntax of a particular property can be intentionally left as incomplete (e.g. an opening "<" token without its closing "/>" counterpart) because the application will append another property to the incomplete property at runtime, where the appended other property is expected to include the closing counterpart token.

Computer System

Figure 7:
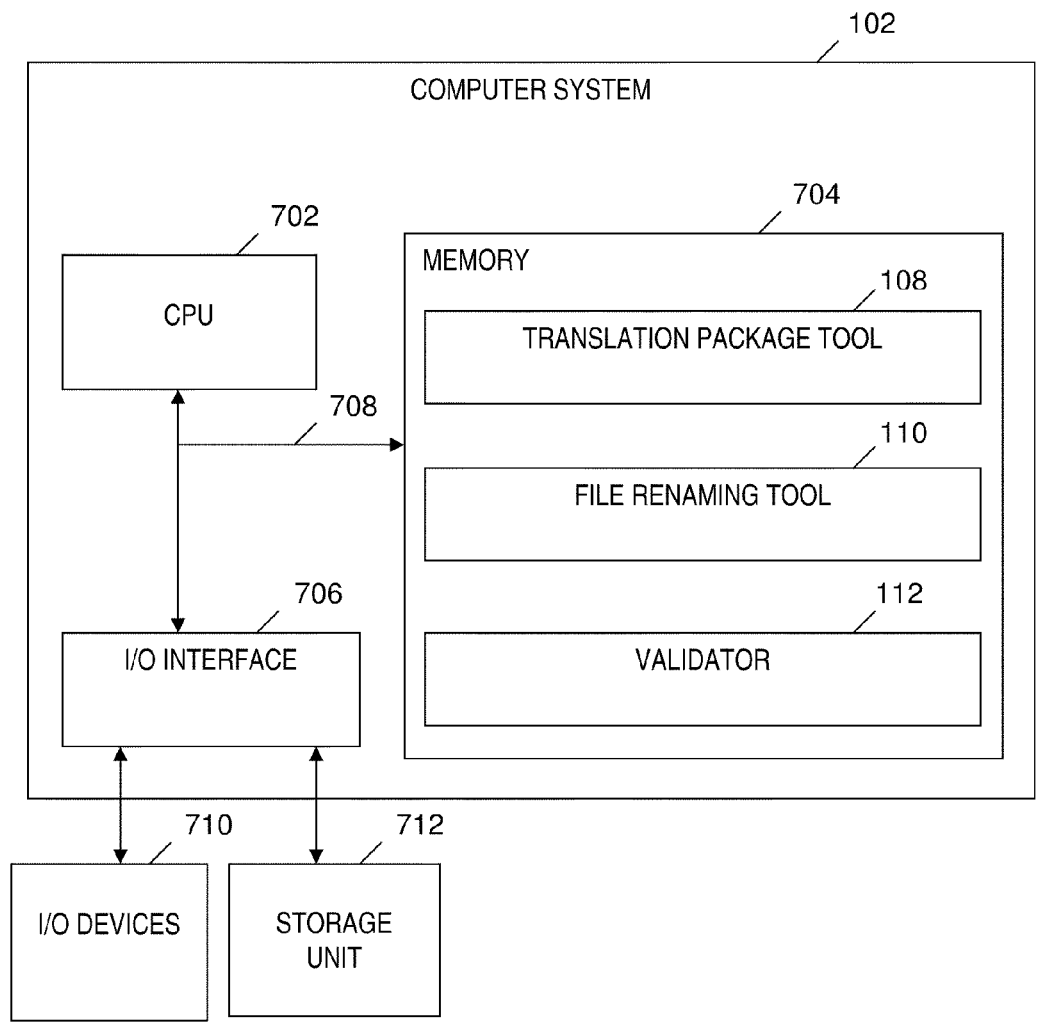
FIG. 7 is a block diagram of a computer system that is included in the system of FIG. 1 and that implements the processes of FIGS. 2A-2B, FIG. 5 and FIG. 6.

FIG. 7 is a block diagram of a computer system that is included in the system of FIG. 1 and that implements the processes of FIGS. 2A-2B, FIG. 5 and FIG. 6. Computer system 102 generally comprises a central processing unit (CPU) 702, a memory 704, an I/O interface 706, and a bus 708. Further, computer system 102 is coupled to I/O devices 710 and a computer data storage unit 712. CPU 702 performs computation and control functions of computer system 102. CPU 702 may comprise a single processing unit, or be distributed across one or more processing units in one or more locations (e.g., on a client and server).

Memory 704 may comprise any known computer readable storage medium, which is described below. In one embodiment, cache memory elements of memory 704 provide temporary storage of at least some program code (e.g., program code 108, 110, 112) in order to reduce the number of times code must be retrieved from bulk storage while instructions of the program code are carried out. Moreover, similar to CPU 702, memory 704 may reside at a single physical location, comprising one or more types of data storage, or be distributed across a plurality of physical systems in various forms. Further, memory 704 can include data distributed across, for example, a local area network (LAN) or a wide area network (WAN).

I/O interface 706 comprises any system for exchanging information to or from an external source. I/O devices 710 comprise any known type of external device, including a display device (e.g., monitor), keyboard, mouse, printer, speakers, handheld device, facsimile, etc. Bus 708 provides a communication link between each of the components in computer system 102, and may comprise any type of transmission link, including electrical, optical, wireless, etc.

I/O interface 706 also allows computer system 102 to store and retrieve information (e.g., data or program instructions such as program code 108, 110, 112) from an auxiliary storage device such as computer data storage unit 712 or another computer data storage unit (not shown). Computer data storage unit 712 may comprise any known computer readable storage medium, which is described below. For example, computer data storage unit 712 may be a non-volatile data storage device, such as a magnetic disk drive (i.e., hard disk drive) or an optical disc drive (e.g., a CD-ROM drive which receives a CD-ROM disk).

Memory 704 may store computer program code 108, 110, 112 that provides the logic for validating translated files for inclusion in an application being developed, which is included in the process in FIGS. 2A-2B, FIG. 5 and FIG. 6. Further, memory 704 may include other systems not shown in FIG. 7, such as an operating system (e.g., Linux) that runs on CPU 702 and provides control of various components within and/or connected to computer system 102.

Storage unit 712 and/or one or more other computer data storage units (not shown) that are coupled to computer system 102 may store translatable files 114 (see FIG. 1), sets of translated files received in step 210 (see FIG. 2A), and validation report(s) 116 (see FIG. 1).

As will be appreciated by one skilled in the art, the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system" (e.g., system 100 in FIG. 1 or computer system 102). Furthermore, an embodiment of the present invention may take the form of a computer program product embodied in one or more computer readable medium(s) (e.g., memory 704 or computer data storage unit 712) having computer readable program code (e.g., program code 108, 110, 112) embodied or stored thereon.

Any combination of one or more computer readable medium(s) (e.g., memory 704 and storage unit 712) may be utilized. The computer readable medium may be a computer readable signal medium or a computer readable storage medium. A computer readable storage medium may be, for example, but not limited to, an electronic, magnetic, electromagnetic, or semiconductor system, apparatus, device or any suitable combination of the foregoing. A non-exhaustive list of more specific examples of the computer-readable storage medium includes: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program (e.g., program 108, 110, 112) for use by or in connection with a system, apparatus, or device for carrying out instructions. In one embodiment, a computer readable storage medium is a computer readable, tangible storage device. Each of the terms "computer readable storage medium," "computer readable storage device," and "computer readable, tangible storage device" does not mean a transitory signal per se or a signal propagation medium.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device for carrying out instructions.

Program code (e.g., program code 108, 110, 112) embodied on a computer readable medium may be transmitted using any appropriate medium, including but not limited to wireless, wireline, optical fiber cable, RF, etc., or any suitable combination of the foregoing.

Computer program code (e.g., program code 108, 110, 112) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 7. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIGS. 2A-2B) and/or block diagrams of methods, apparatus (systems) (e.g., FIG. 1 and FIG. 7), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 108, 110, 112). These computer program instructions may be provided to a processor (e.g., CPU 702) of a general purpose computer, special purpose computer, or other programmable data processing apparatus to produce a machine, such that the instructions, which are carried out via the processor of the computer or other programmable data processing apparatus, create means for implementing the functions/acts specified in the flowchart and/or block diagram block or blocks.

These computer program instructions may also be stored in a computer readable medium (e.g., memory 704 or computer data storage unit 712) that can direct a computer (e.g., computer system 102), other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to the process of validating translated files for inclusion in an application being developed. Thus, an embodiment of the present invention discloses a process for supporting computer infrastructure, comprising integrating, hosting, maintaining and deploying computer-readable code (e.g., program code 108, 110, 112) into a computer system (e.g., computer system 102), wherein the code in combination with the computer system is capable of performing a process of validating translated files for inclusion in an application being developed.

In another embodiment, the invention provides a business method that performs the process steps of the invention on a subscription, advertising and/or fee basis. That is, a service provider, such as a Solution Integrator, can offer to create, maintain, support, etc. a process of validating translated files for inclusion in an application being developed. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowchart in FIGS. 2A-2B and the block diagrams in FIG. 1 and FIG. 7 illustrate the architecture, functionality, and operation of possible implementations of systems, methods, and computer program products according to various embodiments of the present invention. In this regard, each block in the flowchart or block diagrams may represent a module, segment, or portion of code (e.g., program code 108, 110, 112), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of validating translated files for inclusion in an application being developed, comprising:

a computer system sending a translatable file having externalized content in a single base natural language to a plurality of other computer systems, wherein said externalized content is external to code of said application being developed;

in response to a generation of a first translated file including a first translation of said externalized content into a natural language other than said base natural language by another computer system included in said plurality of other computer systems, said computer system receiving said first translated file from said other computer system;

in a simulation environment, a processor of said computer system simulating a loading of said first translation of said externalized content into a user interface of said application at a runtime of said application and simulating a presentation of said first translation of said externalized content in said user interface at said runtime, by calling one or more functions included in said application, without an actual presentation of said first translation of said externalized content in said user interface, wherein an execution at said runtime of said one or more functions displays said externalized content in said user interface;

said computer system determining whether the simulating of the loading of said first translation of said externalized content into said user interface and the simulating of the presentation of said first translation of said externalized content in said user interface by said calling said one or more functions indicates an error condition that causes said application to stop running at said runtime;

based in part on said error condition being indicated by said simulating of the loading of said first translation and said simulating of the presentation of said first translation, said computer system: determining said first translation of said externalized content includes a syntax error that causes said error condition, generating a report including an identification of a portion of said first translation of said externalized content that includes said syntax error and an error message that is generated by said application at said runtime in response to said error condition, and initiating a correction of said syntax error by sending said report to said other computer system, wherein said syntax error includes at least one of: (1) a first key included in said first translated file is not matched with exactly one corresponding first value in said first translated file, said first translated file being a first property file including first key-value pairs including said first key and said first value as one of the pairs; (2) a second key in said translatable file is not in said first translated file, said translatable file being a second property file including second key-value pairs, one of the second key-value pairs including said second key; and (3) one or more placeholders in said first translated file are not matched to respective one or more placeholders in said translatable file, said one or more placeholders in said first translated file and said one or more placeholders in said translatable file providing variable substitution by being filled in with actual values by said code of said application at said runtime;

based in part on said error condition being indicated by said simulating of the loading of said first translation and said simulating of the presentation of said first translation and in response to a completion by said other computer system of said correction of said syntax error included in said first translation of said externalized content and a generation by said other computer system of a second translated file including a second translation of said externalized content which includes said correction of said syntax error, said computer system receiving said second translation of said externalized content which includes said correction of said syntax error; and based in part on said error condition being indicated by said simulating of the loading of said first translation and said simulating of the presentation of said first translation and in response to said receiving second translation of said externalized content which includes said correction of said syntax error:

said computer system simulating a loading of said second translation of said externalized content into said user interface of said application at said runtime and simulating a presentation of said second translation of said externalized content in said user interface at said runtime, by calling said one or more functions, without an actual presentation of said second translation of said externalized content in said user interface; and said computer system determining whether said simulating of the loading of said second translation and said simulating of the presentation of said second translation by said calling said one or more functions indicates said error condition that causes said application to stop running at said runtime; and based in part on said error condition not being indicated by said simulating of the loading of said second translation and said simulating of the presentation of said second translation, said computer system at said runtime presenting said second translation of said externalized content in said user interface without causing said application to stop running at said runtime; and based in part on said error condition not being indicated by said simulating of the loading of said first translation and said simulating of the presentation of said first translation, said computer system at said runtime presenting said first translation of said externalized content in said user interface without causing said application to stop running at said runtime.

2. The method of claim 1, further comprising:

said computer system presenting a graphical user interface (GUI) that displays entries of said first translated file in proximity to corresponding entries of said translatable file;

said computer system receiving and storing an identification of a second in said first translated based on a comparison, via said GUI, of said entries of said first translated file against said corresponding entries of said translatable file;

said computer system initiating a correction of said second error by said other computer system; and based in part on a completion of said correction of said second error by said other computer system and a generation by said other computer system of said second translate file which includes said correction of said second error, said computer system receiving said second translated file and validating said second translated file by determining said second error is not included in said second translated file, wherein said presenting at said runtime of said second translation of said externalized content in said user interface is further based on said determining said second error is not included in said second translated file.

3. The method of claim 1, further comprising prior to said sending said translatable file, said computer system identifying and correcting one or more errors in said translatable file to conform to syntax rules of translation systems running on said other computer systems.

4. The method of claim 1, further comprising:

subsequent to said receiving said first translated file, said computer system reformatting said first translated file to conform to requirements of said application;

subsequent to said receiving said first translated file, said computer system renaming said first translated file with a unique corresponding file name consisting of first, second and third portions, wherein said first portion of said file name indicates a language of said plurality of languages, said second portion of said file name indicates a country of a plurality of countries, and said third portion of said file name indicates a region of a plurality of regions, said region being within said country, and wherein said country and said region within said country together specify a variant of said language;

said computer system generating a file structure; and subsequent to said renaming, said computer system storing said first translated file in a portion of said file structure identified by said first, second and third portions of said file name.

5. A computer program product, comprising:

a computer readable memory; and a computer readable program code stored in the computer readable memory, said computer readable program code containing instructions that are executed by a central processing unit (CPU) of a computer system to implement a method of validating translated files for inclusion in an application being developed, said method comprising the steps of:

said computer system sending a translatable file having externalized content in a single base natural language to a plurality of other computer systems, wherein said externalized content is external to code of said application being developed;

in response to a generation of a first translated file including a first translation of said externalized content into a natural language other than said base natural language by another computer system included in said plurality of other computer systems, said computer system receiving said first translated file from said other computer system;

in a simulation environment, said computer system simulating a loading of said first translation of said externalized content into a user interface of said application at a runtime of said application and simulating a presentation of said first translation of said externalized content in said user interface at said runtime, by calling one or more functions included in said application, without an actual presentation of said first translation of said externalized content in said user interface, wherein an execution at said runtime of said one or more functions displays said externalized content in said user interface;

said computer system determining whether the simulating of the loading of said first translation of said externalized content into said user interface and the simulating of the presentation of said first translation of said externalized content in said user interface by said calling said one or more functions indicates an error condition that causes said application to stop running at said runtime;

based in part on said error condition being indicated by said simulating of the loading of said first translation and said simulating of the presentation of said first translation, said computer system: determining said first translation of said externalized content includes a syntax error that causes said error condition, generating a report including an identification of a portion of said first translation of said externalized content that includes said syntax error and an error message that is generated by said application at said runtime in response to said error condition, and initiating a correction of said syntax error by sending said report to said other computer system, wherein said syntax error includes at least one of: (1) a first key included in said first translated file is not matched with exactly one corresponding first value in said first translated file, said first translated file being a first property file including first key-value pairs including said first key and said first value as one of the pairs; (2) a second key in said translatable file is not in said first translated file, said translatable file being a second property file including second key-value pairs, one of the second key-value pairs including said second key; and (3) one or more placeholders in said first translated file are not matched to respective one or more placeholders in said translatable file, said one or more placeholders in said first translated file and said one or more placeholders in said translatable file providing variable substitution by being filled in with actual values by said code of said application at said runtime;

based in part on said error condition being indicated by said simulating of the loading of said first translation and said simulating of the presentation of said first translation and in response to a completion by said other computer system of said correction of said syntax error included in said first translation of said externalized content and a generation by said other computer system of a second translated file including a second translation of said externalized content which includes said correction of said syntax error, said computer system receiving said second translation of said externalized content which includes said correction of said syntax error; and based in part on said error condition being indicated by said simulating of the loading of said first translation and said simulating of the presentation of said first translation and in response to said receiving second translation of said externalized content which includes said correction of said syntax error:

said computer system simulating a loading of said second translation of said externalized content into said user interface of said application at said runtime and simulating a presentation of said second translation of said externalized content in said user interface at said runtime, by calling said one or more functions, without an actual presentation of said second translation of said externalized content in said user interface; and said computer system determining whether said simulating of the loading of said second translation and said simulating of the presentation of said second translation by said calling said one or more functions indicates said error condition that causes said application to stop running at said runtime; and based in part on said error condition not being indicated by said simulating of the loading of said second translation and said simulating of the presentation of said second translation, said computer system at said runtime presenting said second translation of said externalized content in said user interface without causing said application to stop running at said runtime; and based in part on said error condition not being indicated by said simulating of the loading of said first translation and said simulating of the presentation of said first translation, said computer system at said runtime presenting said first translation of said externalized content in said user interface without causing said application to stop running at said runtime.

6. The program product of claim 5, wherein said method further comprises:

said computer system presenting a graphical user interface (GUI) that displays entries of said first translated file in proximity to corresponding entries of said translatable file;

said computer system receiving and storing an identification of a second in said first translated file based on a comparison, via said GUI, of said entries of said first translated file against said corresponding entries of said translatable file;

said computer system initiating a correction of said second error by said other computer system; and based in part on a completion of said correction of said second error by said other computer system and a generation by said other computer system of said second translate file which includes said correction of said second error, said computer system receiving said second translated file and validating said second translated file by determining said second error is not included in said second translated file, wherein said presenting at said runtime of said second translation of said externalized content in said user interface is further based on said determining said second error is not included in said second translated file.

7. A computer system comprising:
a central processing unit (CPU);
a memory coupled to the CPU;
a computer-readable, tangible storage device coupled to the CPU, the storage device containing instructions that are executed by the CPU via the memory to implement a method of validating translated files for inclusion in an application being developed, wherein said method comprises:

said computer system sending a translatable file having externalized content in a single base natural language to a plurality of other computer systems, wherein said externalized content is external to code of said application being developed;

in response to a generation of a first translated file including a first translation of said externalized content into a natural language other than said base natural language by another computer system included in said plurality of other computer systems, said computer system receiving said first translated file from said other computer system;

in a simulation environment, said computer system simulating a loading of said first translation of said externalized content into a user interface of said application at a runtime of said application and simulating a presentation of said first translation of said externalized content in said user interface at said runtime, by calling one or more functions included in said application, without an actual presentation of said first translation of said externalized content in said user interface, wherein an execution at said runtime of said one or more functions displays said externalized content in said user interface;

said computer system determining whether the simulating of the loading of said first translation of said externalized content into said user interface and the simulating of the presentation of said first translation of said externalized content in said user interface by said calling said one or more functions indicates an error condition that causes said application to stop running at said runtime;

based in part on said error condition being indicated by said simulating of the loading of said first translation and said simulating of the presentation of said first translation, said computer system: determining said first translation of said externalized content includes a syntax error that causes said error condition, generating a report including an identification of a portion of said first translation of said externalized content that includes said syntax error and an error message that is generated by said application at said runtime in response to said error condition, and initiating a correction of said syntax error by sending said report to said other computer system, wherein said syntax error includes at least one of: (1) a first key included in said first translated file is not matched with exactly one corresponding first value in said first translated file, said first translated file being a first property file including first key-value pairs including said first key and said first value as one of the pairs; (2) a second key in said translatable file is not in said first translated file, said translatable file being a second property file including second key-value pairs, one of the second key-value pairs including said second key; and (3) one or more placeholders in said first translated file are not matched to respective one or more placeholders in said translatable file, said one or more placeholders in said first translated file and said one or more placeholders in said translatable file providing variable substitution by being filled in with actual values by said code of said application at said runtime;

based in part on said error condition being indicated by said simulating of the loading of said first translation and said simulating of the presentation of said first translation and in response to a completion by said other computer system of said correction of said syntax error included in said first translation of said externalized content and a generation by said other computer system of a second translated file including a second translation of said externalized content which includes said correction of said syntax error, said computer system receiving said second translation of said externalized content which includes said correction of said syntax error; and based in part on said error condition being indicated by said simulating of the loading of said first translation and said simulating of the presentation of said first translation and in response to said receiving second translation of said externalized content which includes said correction of said syntax error:

said computer system simulating a loading of said second translation of said externalized content into said user interface of said application at said runtime and simulating a presentation of said second translation of said externalized content in said user interface at said runtime, by calling said one or more functions, without an actual presentation of said second translation of said externalized content in said user interface; and said computer system determining whether said simulating of the loading of said second translation and said simulating of the presentation of said second translation by said calling said one or more functions indicates said error condition that causes said application to stop running at said runtime; and based in part on said error condition not being indicated by said simulating of the loading of said second translation and said simulating of the presentation of said second translation, said computer system at said runtime presenting said second translation of said externalized content in said user interface without causing said application to stop running at said runtime; and based in part on said error condition not being indicated by said simulating of the loading of said first translation and said simulating of the presentation of said first translation, said computer system at said runtime presenting said first translation of said externalized content in said user interface without causing said application to stop running at said runtime.

8. The program product of claim 5, wherein said method further comprises prior to said sending said translatable file, said computer system identifying and correcting one or more errors in said translatable file to conform to syntax rules of translation systems running on said other computer systems.

9. The program product of claim 5, wherein said method further comprises:

subsequent to said receiving said first translated file, said computer system reformatting said first translated file to conform to requirements of said application;

subsequent to said receiving said first translated file, said computer system renaming said first translated file with a unique corresponding file name consisting of first, second and third portions, wherein said first portion of said file name indicates a language of said plurality of languages, said second portion of said file name indicates a country of a plurality of countries, and said third portion of said file name indicates a region of a plurality of regions, said region being within said country, and wherein said country and said region within said country together specify a variant of said language;

said computer system generating a file structure; and subsequent to said renaming, said computer system storing said first translated file in a portion of said file structure identified by said first, second and third portions of said file name.

10. The computer system of claim 7, wherein said method further comprises:
- said computer system presenting a graphical user interface (GUI) that displays entries of said first translated file in proximity to corresponding entries of said translatable file;
- said computer system receiving and storing an identification of a second error in said first translated file based on a comparison, via said GUI, of said entries of said first translated file against said corresponding entries of said translatable file;
- said computer system initiating a correction of said second error by said other computer system; and
- based in part on a completion of said correction of said second error by said other computer system and a generation by said other computer system of said second translate file which includes said correction of said second error, said computer system receiving said second translated file and validating said second translated file by determining said second error is not included in said second translated file,
- wherein said presenting at said runtime of said second translation of said externalized content in said user interface is further based on said determining said second error is not included in said second translated file.

11. The computer system of claim 7, wherein said method further comprises prior to said sending said translatable file, said computer system identifying and correcting one or more errors in said translatable file to conform to syntax rules of translation systems running on said other computer systems.

12. The computer system of claim 7, wherein said method further comprises:
- subsequent to said receiving said first translated file, said computer system reformatting said first translated file to conform to requirements of said application;
- subsequent to said receiving said first translated file, said computer system renaming said first translated file with a unique corresponding file name consisting of first, second and third portions, wherein said first portion of said file name indicates a language of said plurality of languages, said second portion of said file name indicates a country of a plurality of countries, and said third portion of said file name indicates a region of a plurality of regions, said region being within said country, and wherein said country and said region within said country together specify a variant of said language;
- said computer system generating a file structure; and
- subsequent to said renaming, said computer system storing said first translated file in a portion of said file structure identified by said first, second and third portions of said file name.

* * * * *